March 14, 1967  B. P. FRANKLIN ET AL  3,308,816
QUICK DONNING FRAME FOR RESPIRATOR MASKS AND THE LIKE
Filed Aug. 7, 1964  3 Sheets-Sheet 3
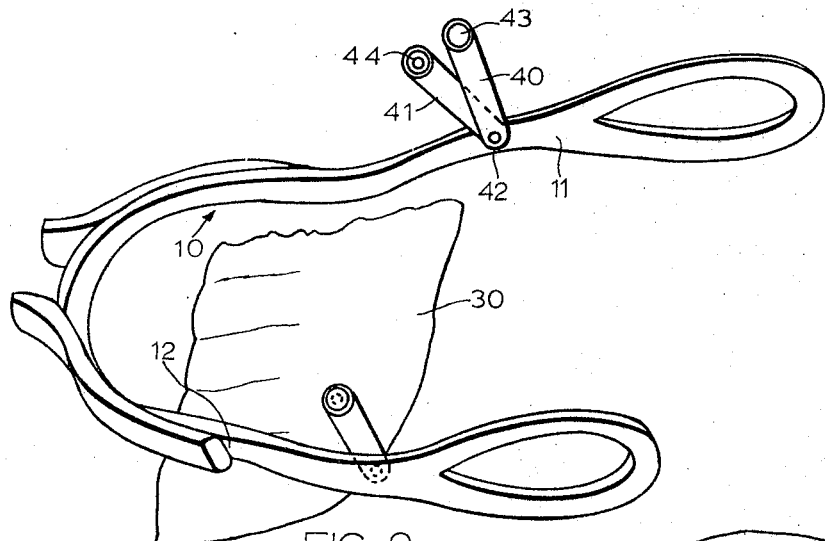
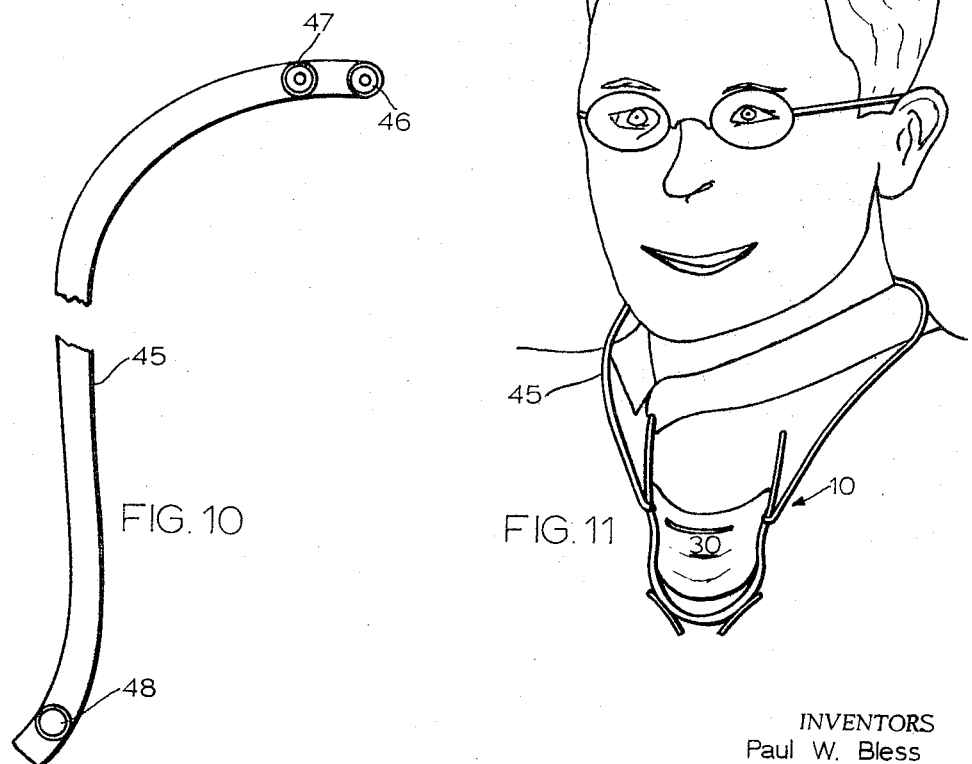
INVENTORS
Paul W. Bless
Burton P. Franklin
BY  B. B. Olive
ATTORNEY

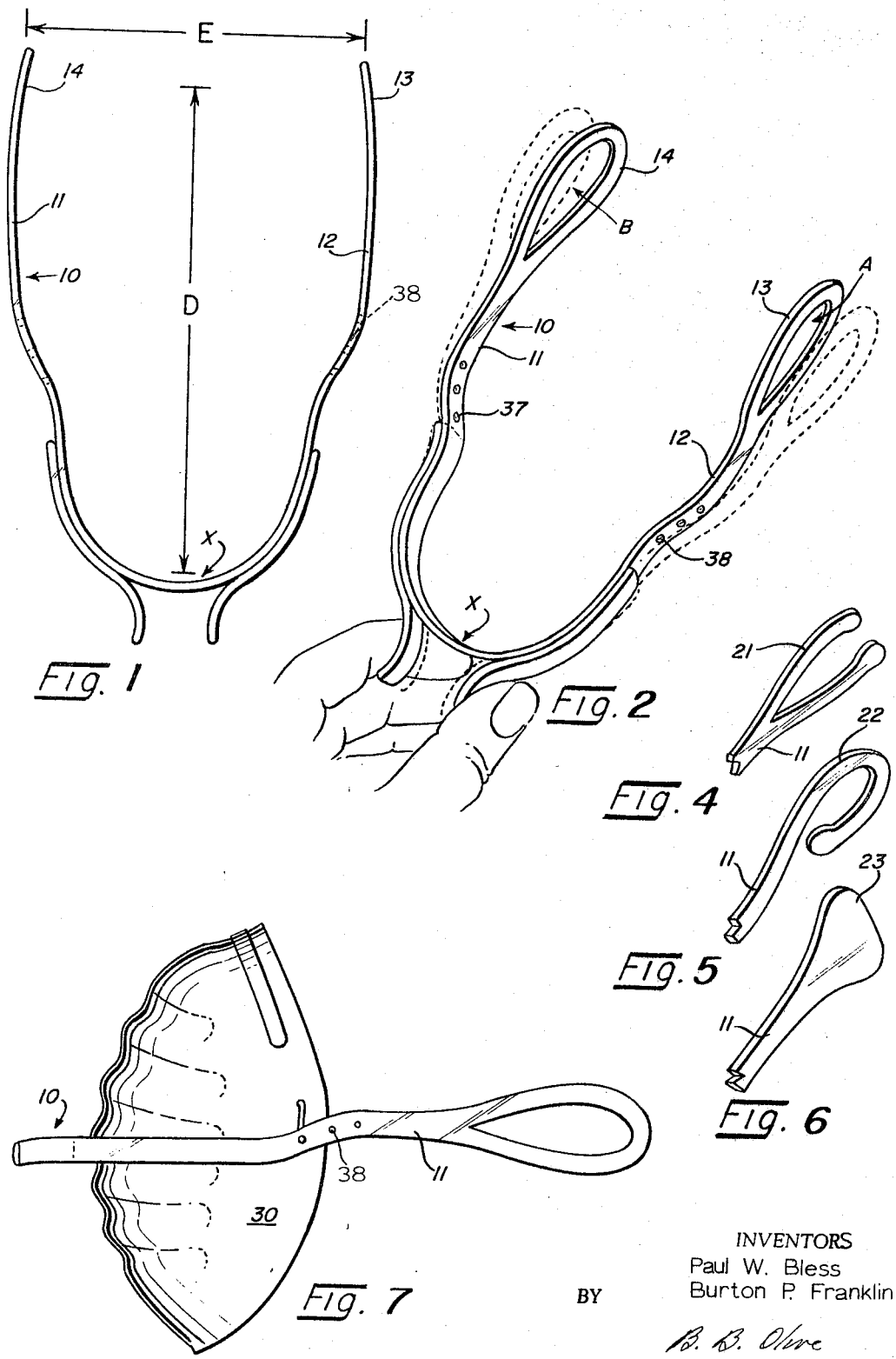

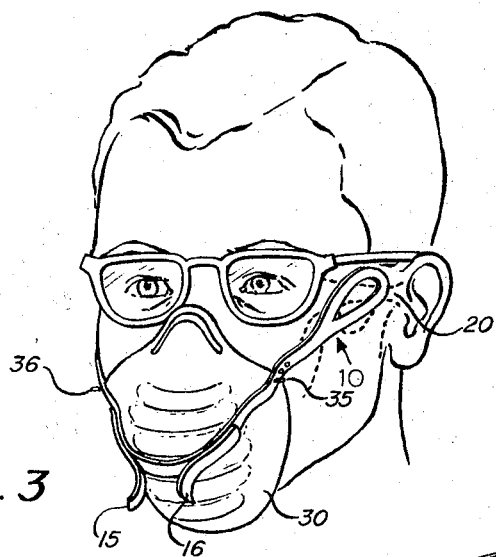
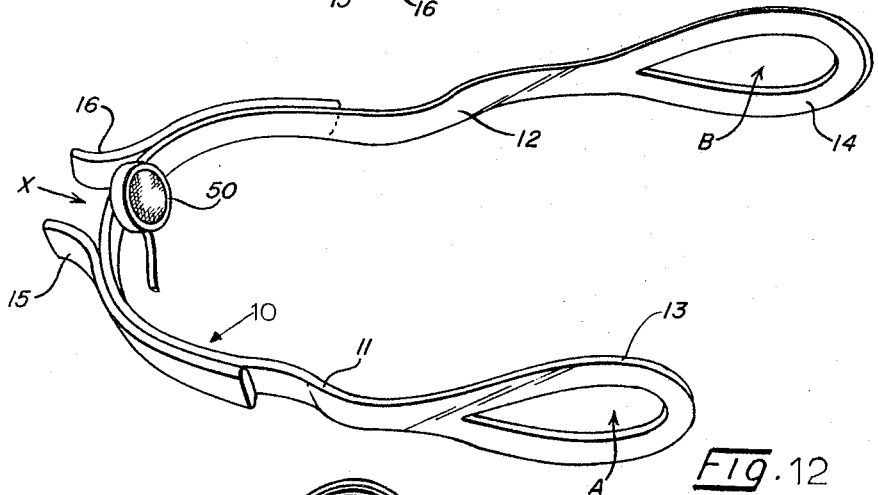
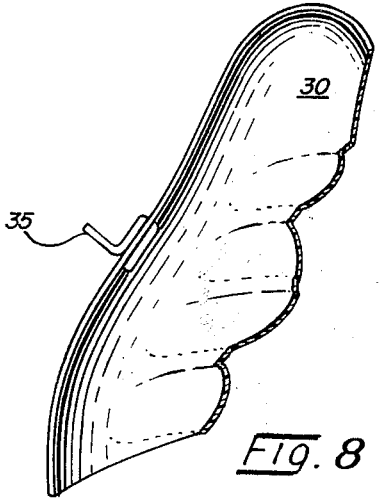

United States Patent Office 3,308,816
Patented Mar. 14, 1967

3,308,816
QUICK DONNING FRAME FOR RESPIRATOR MASKS AND THE LIKE
Burton P. Franklin, Danville, Va., and Paul W. Bless, Leaksville, N.C., assignors, by mesne assignments, to Dynamic Products Company, Durham, N.C., a partnership
Filed Aug. 7, 1964, Ser. No. 388,111
2 Claims. (Cl. 128—146.2)

This invention relates to a head frame particularly suited to holding lightweight devices such as respirator masks, microphones, sunglasses, protective visors and the like in position on a wearer's face. More especially the invention relates to a head frame that can be clamped to and supported from the sides of the wearer's face in front of his ears proximate the zygomatic arch and tempo-mandibular joints.

A review of the prior art indicates that lightweight molded plastic, molded paper, gauze and similar filter media are widely used in face masks for surgical, dental, dust, paint spray and other protection. A popular and inexpensive lightweight molded filter face mask, for example, is sold by Minnesota Mining and Manufacturing Company of St. Paul, Minnesota and is used as an illustration in the drawings later referred to. Irrespective of the type of specific prior art face mask employed however the mask has been customarily supported on the face by a tie band or adjustable strap which extends around the back of the head as illustrated by Patent 2,578,007 or by some type of frame supported on the wearer's ears as illustrated by Patent 2,237,305 or 2,081,779. A somewhat different approach is suggested by Patent 3,013,556 which utilizes the back of the head as a place of support. In all such prior art however the masks can neither be donned or removed quickly nor can they be worn for long periods with any degree of comfort. Furthermore, the conventional straps and face mask support devices usually interfere with wearing glasses.

The general object of the present invention is therefore to provide a device for supporting lightweight face masks and the like which can be donned quickly, which can be worn for relatively long periods and which does not interfere with the wearer's eyeglasses.

Other objects and advantages of the invention will become more apparent as the following description progresses, reference being had to the accompanying drawings in which like reference characters are employed to designate like parts throughout the same.

In the drawings:

FIGURE 1 is a plan view of a frame embodying the invention.

FIGURE 2 is a perspective view illustrating how the frame ends are spread prior to donning.

FIGURE 3 is a perspective view of the frame as worn with glasses and with a prior art respirator mask.

FIGURES 4, 5 and 6 are alternative end piece configurations.

FIGURE 7 is a side elevation view of the frame supporting the respirator mask.

FIGURE 6 is a partial rear elevation view of the respirator mask.

FIGURE 9 is a perspective view of the frame with snap fastener devices for attaching the mask.

FIGURE 10 is a perspective view of a neck holding strap.

FIGURE 11 is a perspective view of the frame and mask as worn when held by the neck strap.

FIGURE 12 is a perspective view of the frame supporting a microphone.

My previously mentioned, prior art respirator masks have been supported on the head by straps, ear encircling frames or devices which clamp to the back of the head. The present invention departs from the prior art and recognizes that respirator mask support members can be clamped to the face in front of the wearer's ears in the area of the zygomatic arch and tempo-mandibular joints without causing fatigue or discomfort even over prolonged periods of use and without interferring with the wearer's eyeglass frame. In general, the invention in its preferred form comprises a U-shaped frame having ends which can be clamped to the wearer's face in front of his ears in the area of the zygomatic arch and tempo-mandibular joints and which can support lightweight devices such as respirator masks and microphones.

The frame constituting the invention has been designated to 10. Frame 10 is generally U-shaped and includes a pair of connected opposed side pieces 11, 12 which in turn include a pair of respective opposed end pieces 13, 14. A pair of opposed tumb pieces 15, 16 are preferably molded integral with side pieces 11, 12 though they may be glued or otherwise secured to the outside of frame 10 near its apex designated by X. As illustrated by FIGURE 2, thumb pieces 15, 16 enable the wearer to spread the end pieces 13, 14 for quick donning and placing on the face as in FIGURE 3 or for quick removal to the position of FIGURE 11. This spring effect is much to be desired since the frame position depends upon the frame being relatively tightly clamped to the face by having the end pieces 13, 14 engage the skin in front of the wearer's ears in the area of the wearer's zygomatic arches and tempo-mandibular joints.

Various plastic, metal and other materials may be employed for making the basic frame 10. Portions of frame 10 may also be made of different materials. Consideration should be given to the ability of the material or combination of materials chosen to give the necessary resilience or spring effect. The material or combination of materials chosen should also preferably be light in weight and capable of withstanding autoclave sterilizing temperatures. Many of the well known modern plastics and various metals meet these characteristics and also offer the possibility of making the frame in different colors.

While frame 10 can be made and sold in various sizes, if only one size is employed distance D, FIGURE 1, should be slightly larger than the distance between the average wearer's zygomatic arch and tempo-mandibular joint area and his chin and distance E should be slightly less than the distance between the same areas for average wearer. Of particular interest is the shape of the end pieces 13, 14. A closed elliptical loop is preferred since skin over the zygomatic arch-tempo-mandibular joint areas of the wearer will tend to pucker within the confined areas such as at A and B. A wishbone shape such as at 21 in FIGURE 4 and a discontinuous elliptical loop such as at 22 in FIGURE 5 will operate effectively. A relatively wide clamping area can be achieved by an end piece shaped such as FIGURE 6 even though end piece shapes such as in FIGURES 2, 4 and 5 are to be preferred since they circumscribe a given area. It is also noted that the end pieces may be roughened where they strike the skin to increase the frictional effect.

As previously mentioned, frame 10 may be utilized to support any lightweight face device which may be the respirator mask 30 shown in FIGURES 3, 7 and 11 or it may be, for example, a typical lightweight microphone such as represented at 50 in FIGURE 12. Particularly with regard to face respirator masks as might, for example, be used in dentistry or surgery, mask 30 will be recognized as being the type expendable surgical face mask currently marketed by Minnesota Mining and Manufacturing Company of St. Paul, Minnesota. As conventionally sold, such masks come with an elastic strap attached to the mask. This strap is, of course, not needed in the present invention since mask 30 is supported on frame 10. With the conventional elastic strap removed there is installed near the places where the elastic strap is normally attached a pair of bent wire pins 35, 36 which are bent to engage a portion of the mask as shown in FIGURE 8 and which extend outwardly to engage one of the holes provided at 37 in side piece 11 and at 38 in side piece 12. By having a number of possible holes in each side piece as shown, pins 35, 36 can be adjusted to the holes suited to the wearer's particular size face.

A preferred mask fastening arrangement is shown in FIGURE 9. In this arrangement a pair of short elastic straps such as at 40, 41 are secured together at one end as at 42 to the side piece such as side piece 11. At the respective opposite ends of straps 40, 41 there are provided male and female snap-fasteners as at 43, 44. The snap-fasteners are shown disengaged at the top of FIGURE 9 whereas at the bottom of FIGURE 9, a similar pair of straps and snap-fasteners are shown as they appear engaged and grasping one side of mask 30 between the fasteners. While not depicted in the drawings, it will be understood that the described elastic strap arrangement adjusts to various size faces by allowing the straps 40, 41 to stretch according to the size of the wearer's face.

A frame of the kind described is of special value to dentists and others similarly situated who have heretofore had no type of face mask available which could be both donned and removed quickly. FIGURE 10 illustrates a neck strap 45 having end snap-fasteners as shown unfastened at 46, 47 and fastened to form a loop as at 48. By fastening the loop ends of strap 45 around frame 10 just in front of the end pieces 13, 14, the dentist, for example, may keep mask 30 hanging below his face during discussion with the patient and ready for immediate donning when drilling. Of particular importance is the fact that the dentist can don the mask without assistance and without having to make any adjustments.

The principles of the present invention may of course be utilized in various ways, it being understood that the embodiment shown in the drawing and illustrated above is given merely for purposes of explanation and illustration without intending to limit the scope of the claims to the specific details disclosed.

What is claimed is:

1. In a mask device, in combination, a respirator mask adapted for use before the wearer's face; a head frame comprising an integral U-shaped resilient lightweight body portion including opposed sides, a closed end connecting the sides, and a pair of opposed finger press members on said body portion adapted to provide means for spreading said sides to facilitate donning, said body portion being designed to encircle the face between points in front of each ear, said sides being spaced apart at their free ends a distance less than the wearer's head measured at said points, said free ends being formed as relatively flat expansive shapes adapted to engage substantially large areas of the face at said points such that when said sides are spread and said free ends placed over said points and said sides then relaxed, said frame will be clamped to the wearer's head sufficient to provide support for said mask; and means for adjustably mounting said mask comprising a pair of elastic bands each secured at one end to respective ones of said sides and having snap fastener means at the other end adapted to grasp said mask.

2. In a mask device as claimed in claim 1 wherein said flat expansive shapes comprise elliptical shaped loops.

References Cited by the Examiner
UNITED STATES PATENTS

| | | | |
|---|---|---|---|
| 714,664 | 12/1902 | Briggs | 351—114 |
| 962,873 | 6/1910 | Alter | 351—65 |
| 1,942,298 | 1/1934 | Le Doux | 351—113 |
| 2,081,779 | 5/1937 | Titus | 128—146 |

RICHARD A. GAUDET, *Primary Examiner.*

K. L. HOWELL, *Assistant Examiner.*